E. H. TAYLOR.
CORNER STAYING MACHINE FOR PAPER BOXES.
APPLICATION FILED AUG. 8, 1906.

1,079,616.

Patented Nov. 25, 1913.

E. H. TAYLOR.
CORNER STAYING MACHINE FOR PAPER BOXES.
APPLICATION FILED AUG. 8, 1906.

1,079,616.

Patented Nov. 25, 1913.
8 SHEETS—SHEET 3.

Witnesses:
John H. Parker
Aline Tarr

Inventor:
Eugene H. Taylor
by Macleod, Calver, Copeland & Dike
Attorneys.

E. H. TAYLOR.
CORNER STAYING MACHINE FOR PAPER BOXES.
APPLICATION FILED AUG. 8, 1906.

1,079,616.

Patented Nov. 25, 1913.

E. H. TAYLOR.
CORNER STAYING MACHINE FOR PAPER BOXES.
APPLICATION FILED AUG. 8, 1906.

1,079,616.

Patented Nov. 25, 1913.
8 SHEETS—SHEET 5.

Witnesses:
John H. Parker
Aline Tarr

Inventor:
Eugene H. Taylor
by Macleod, Calver, Copeland & Dike
Attorneys.

E. H. TAYLOR.
CORNER STAYING MACHINE FOR PAPER BOXES.
APPLICATION FILED AUG. 8, 1906.

1,079,616.

Patented Nov. 25, 1913.

Witnesses:
John H. Parker
Aline Tarr

Inventor:
Eugene H. Taylor
by Macleod, Calver, Copeland &c.
Attorneys.

E. H. TAYLOR.
CORNER STAYING MACHINE FOR PAPER BOXES.
APPLICATION FILED AUG. 8, 1906.

1,079,616.

Patented Nov. 25, 1913.

Witnesses:
Alice Tarr
John H. Parker

Inventor.
Eugene H. Taylor
by Macleod, Calver, Copeland & Dike,
Attorneys.

E. H. TAYLOR.
CORNER STAYING MACHINE FOR PAPER BOXES.
APPLICATION FILED AUG. 8, 1906.

1,079,616.

Patented Nov. 25, 1913.

Witnesses:
Alice Tarr
John H. Parker

Inventor:
Eugene H. Taylor
by Macleod, Calver, Copeland & Dike,
Attorneys.

UNITED STATES PATENT OFFICE.

EUGENE H. TAYLOR, OF HYDE PARK, MASSACHUSETTS.

CORNER-STAYING MACHINE FOR PAPER BOXES.

1,079,616.   Specification of Letters Patent.   Patented Nov. 25, 1913.

Application filed August 8, 1906. Serial No. 329,687.

*To all whom it may concern:*

Be it known that I, EUGENE H. TAYLOR, citizen of the United States, residing at Hyde Park, in the county of Norfolk and State of Massachusetts, have invented a certain new and useful Improvement in Corner-Staying Machines for Paper Boxes, of which the following is a specification, reference being had therein to the accompanying drawings.

Paper boxes have heretofore been commonly constructed from a blank of cardboard having the corners cut out by folding the sides together to form a box. The adjacent edges of the sides are fastened together by means of gummed paper or cloth known as "stay strip". In the manufacture of boxes of this kind, it has heretofore been customary so far as is now known to me, to place the pieces of gummed stay strip on the four corners successively, the two sides or halves of each piece of stay strip being simultaneously secured to the appropriate portions of the body blanks. This manner of constructing boxes requires that the operator form the box with his hands and position the box in the machine separately for each of the four corners.

My invention has for its object to provide an automatic machine which shall take the cut blanks and the gummed stay strip in rolls, apply one edge of the stay strip simultaneously to all four corners, form the box, attach the other side or edge of the pieces of stay strip to the appropriate portions of the formed blanks, and eject the same in completed form from the machine without the necessity of any hand operation on the part of the operator. It is only necessary that the attendant see that a sufficient number of the blanks are kept in the hopper and a sufficient quantity of stay strip is on the reels, and to gather up the completed boxes as they are ejected from the machine. The machine performs all the operations necessary to form the completed box, and when once started, makes the boxes successively and continuously until stopped.

The box blank occupies three successive positions in the machine, and is operated upon successively by a series of groups of mechanisms. The three positions are the hopper position, pressing and severing position, and forming position. For convenience in the description of the machine, these various groups of mechanisms will be taken up and described in the order in which they occur as the blank travels through the machine.

The invention will be fully understood from the following description taken in connection with the accompanying drawings, and the novel features thereof are pointed out and clearly defined in the claims at the close of this specification.

In the drawings, Fig. 17 is a side view of the said spring plate.

Figures 1, 21, 22, 23:
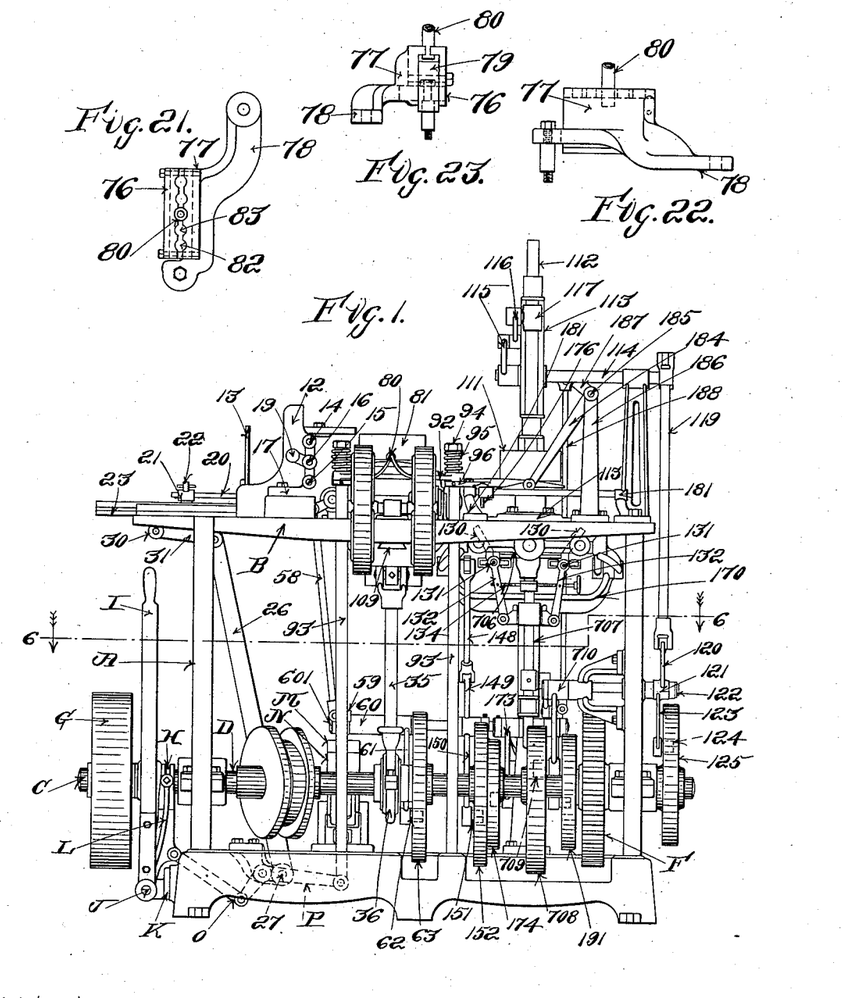
—Figure 1 is a side elevation of the machine embodying my invention.
Fig 21 is a plan view of the moistening casing.
Fig. 22 is a side view thereof.
Fig. 23 is an end view thereof.
Figure 2:
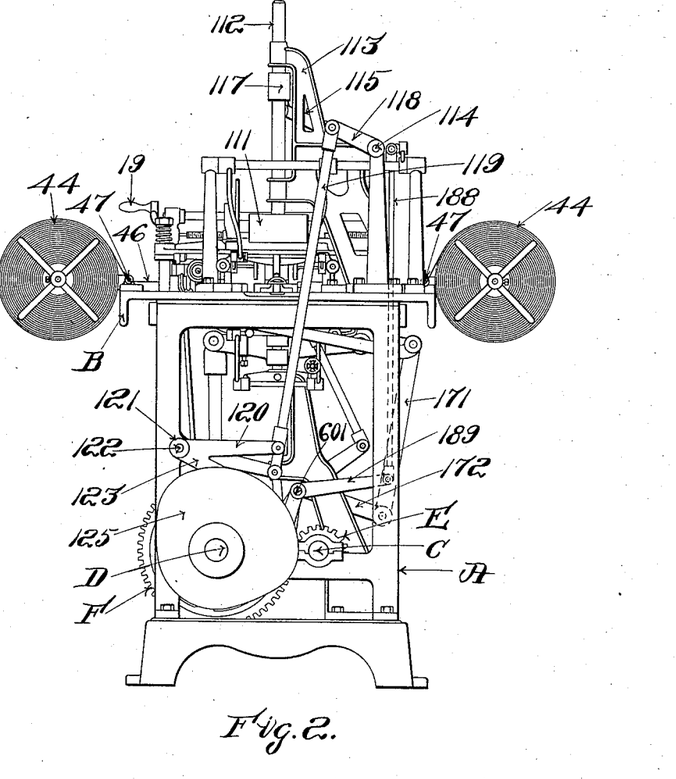
Fig. 2 is an end elevation of the front or end of the machine at which the finished boxes are ejected.
Figures 6, 27:
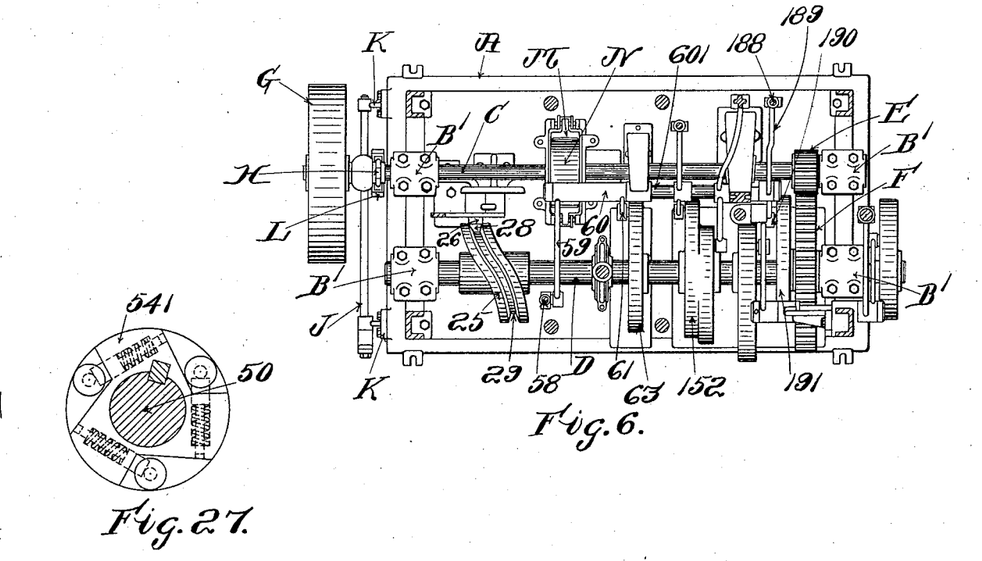
Fig. 6 is a section on line 6—6, Fig. 1, looking downward.
Fig. 27 is a section on line 27—27 Fig. 4.

Referring to the drawings and more particularly to Figs. 1, 2 and 6,—There is indicated at A the frame of the machine which is of any suitable shape and serves to support the various parts in proper relation to each other. On the top of the frame A is the table B. The frame A supports in suitable boxes B' the main driving shaft C and the cam shaft D, the said cam shaft being driven from the said main shaft by means of a pair of gears E and F which are so proportioned to each other that the cam shaft D shall run at a much lower rate of speed than the main shaft C. The main shaft C is actuated by a belt (not shown) on the pulley G. The pulley G runs continuously and the main shaft C is set in motion when desired by means of the clutch H which is actuated by the lever I fast on a rock shaft J which is carried in brackets K on the base of the machine. The rock shaft J is also provided with a forked arm L which operates the clutch in the well-known manner. At M, is provided a brake adapted to engage the brake wheel N on the main shaft C and connected by the link O, bell crank lever P and forked arm L with the hand lever I, so that when the clutch H is thrown out of engagement the main shaft C will be stopped instantly by the action of the brake. The mechanism thus far described is well-known to those skilled in the arm and forms no part of my invention.

The blank feeding and transferring mechanism will now be described, reference being had particularly to Figs. 1, 3, 4 and 5. The pile of blanks from which the boxes are constructed is placed in a hopper composed of two adjustable side walls 11 and 12 and an adjustable back plate 13. The said side walls are provided with tracks 701 and 702 upon which the edges of the blanks rest. The said side walls 11 and 12 are movable laterally to adjust for different lengths of blanks by means of a pair of guide rods 14 and 15 and a right and left screw 16 pivoted in brackets 17 and 18 on the table B of the machine. The said right and left screw 16 is provided at each end with a crank and handle 19 by means of which it may be rotated from either side of the machine to move the side plates 11 and 12 of the hopper in and out as may be desired for adjustment. The back plate 13 is adjustable by means of a rod 20 which extends rearwardly and passes through a lug 21 which is provided with a thumb nut 22 by means of which the rearwardly extending rod 20 and back plate 13 may be permanently fixed in place.

The blank is carried forward from the hopper position to the pressing and severing position, and from the pressing and severing position to the forming position by means of a long carrier or feeder 23 (see Figs. 3, 4, 12, 13, 14 and 15) slidable in ways 24 in the table B of the machine, and provided with two lips 25 and 26, each of which engages a blank during the forward movement of the carrier. The feeder or carrier 23 which is adapted to transfer two blanks at each stroke of the machine, i. e. one blank from the hopper to the pressing and severing position and another from the pressing and severing position to the forming position, is made up of three pieces, the supporting piece 233 and the two feeder strips 231 and 232 supported thereon and adjustable longitudinally with relation to each other. This adjustment is obtained by means of the blocks 234 and 235 which are located in rabbeted spaces 236. Bolts or cap screws 237 and 238, one for each block, serve to hold the blocks 234 and 235 down firmly upon their seats in the feeder strips 231 and 232, and thereby to attach the said feeder strips firmly to the supporting piece 233. By loosening the said cap screws 237 and 238, it will be seen that the said strips 231 and 232 may be adjusted longitudinally upon the underlying piece 233, so that the two lips 25 and 26 which engage the edges of the blanks may be shifted slightly with relation to each other.

A periphery cam 25 (see Figs. 1 and 6) on the cam shaft D actuates the carrier 23 through the cam lever 26, pivoted at 27 to the base of the machine and provided with a cam roll 28 running in the slot 29 in the said periphery cam 25. The upper end of the cam lever is connected to the lug 30 on the underside of the carrier 23 by means of a link 31.

Figure 24:
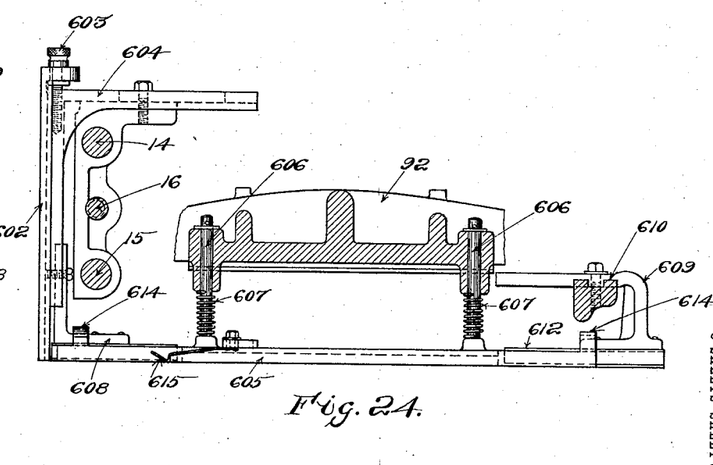
Fig. 24 is a side view of the gate and presser foot showing the devices for supporting them.

A gate 602 (see Figs. 3 and 24) is adjustably mounted by means of a thumb screw 603 on the bracket 604 which is itself supported on the cross rods 14 and 15, and serves to prevent more than one blank in the hopper being carried forward by the feeder or carrier at a time. The said gate may be moved up or down slightly according to the thickness of the stock from which the blanks are cut.

A yieldingly mounted foot 605 extending from the hopper across that portion of the machine known as the pressing and severing position to the rear side of a form to be hereinafter described upon which the blank is shaped is provided to hold the blank down on the feeder or carrier, so that the lip 25 may not become disengaged from the blank. The foot 605 is carried on two rods or pins 606 supported by a presser head 92 and springs 607 are provided which tend to hold the foot 605 down on the blank, but allow it to yield slightly as the blank passes forward. The ends of the said foot 605 are guided and supported by brackets 608 and 609. The bracket 609 is carried on the lower end of the bracket 604 previously referred to, while the bracket 609 is supported on a cross piece 610 on the frame of the machine. Said bracket 609 is provided with a slot 611 (see Fig. 25) which permits the said bracket to be moved forward so that its end may be brought nearer to the form and adjustment thus made for the size of box. The inner end 612 of this bracket extends into a slot 613 in the corresponding end of the foot 605, so that the parts telescope and form a continuous surface for contact with the blank. The other end of the said foot 605 and the bracket 608 are similarly constructed. For the sake of strengthening the ends of the foot 605, a curved bridge 614 (see Fig. 26) is provided.

Figure 25:
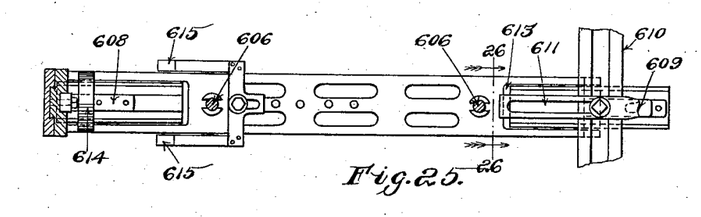
Fig. 25 is a plan view of the parts shown in Fig. 24.
Figure 26:
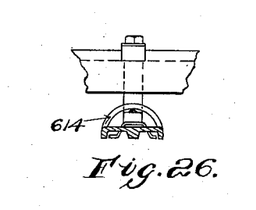
Fig. 26 is a section on line 26—26, Fig. 25, looking in the direction of the arrows.

A ratchet stop 615 made from spring steel or other suitable material is attached to the underside of the foot 605 and serves to prevent the blank being drawn back by the carrier during the return movement of the carrier. The said stop 615 is located at the proper point for the size of box to be made and accordingly is longitudinally adjustable as seen in Fig. 25.

Figures 11, 13, 14, 15, 16, 18:
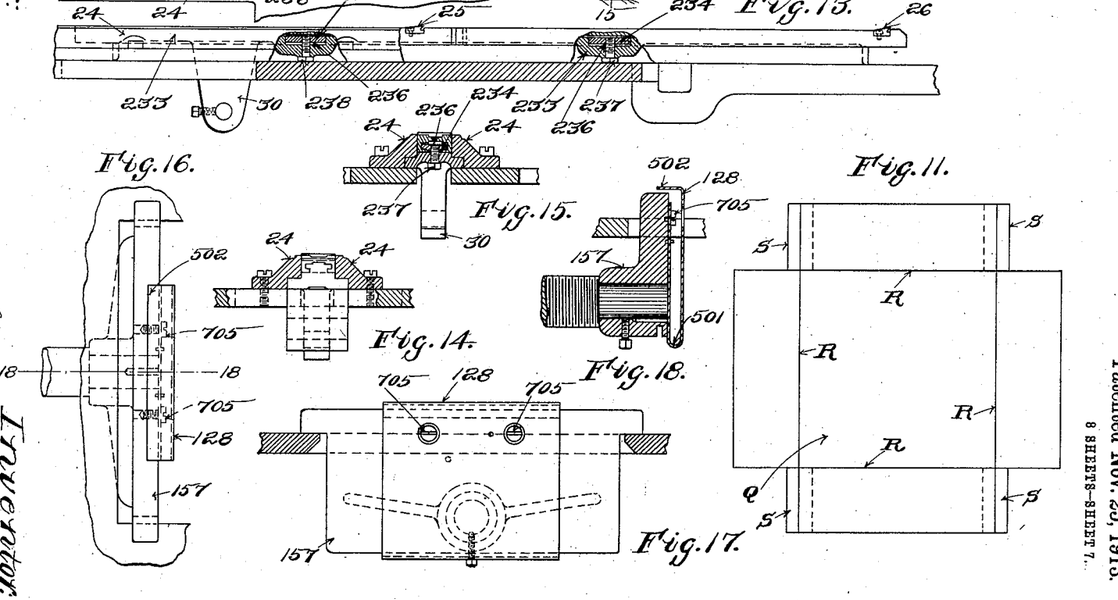
Fig. 11 is a view of a blank with the pieces of stay strip attached thereto.
Fig. 13 is a longitudinal view of the parts shown in Fig. 12, partly in section for convenience of illustration.
Fig. 14 is a view of the right hand end of the parts shown in Fig. 12, partly in section.
Fig. 15 is a section on line 15—15, Fig. 12, looking in the direction of the arrows.
Fig. 16 is a plan view of one of the end spring plates, which assists in forming the blank.
Fig. 18 is a section on line 18—18 of Fig. 16.
Figure 12:
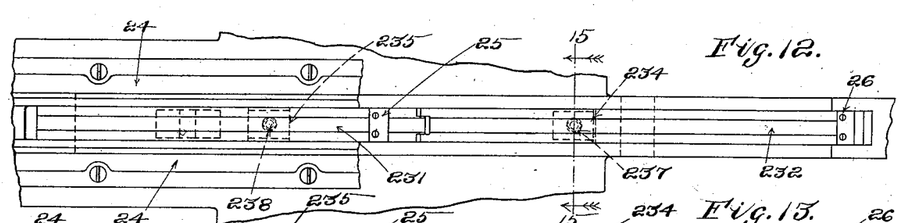
Fig. 12 is a plan view of the feeder or carrier and the related parts.

The box blanks previously to being placed in the hopper are cut to the form shown in Fig. 11, where the box blank is designated Q and the lines upon which it is to be folded to form the box are marked R. In the pressing and severing position, four pieces S of gummed stay strip are cut from rolls of this material and are attached to the box blank Q in the proper places as shown in Fig. 11, one half of each of the said corner stays S projecting beyond the corresponding edge of the box blank Q. The operation of severing the corner stays S from the strips of gummed stay material and attaching these pieces S to the box blanks is performed in what has been previously termed the pressing and severing position.

Figure 4:
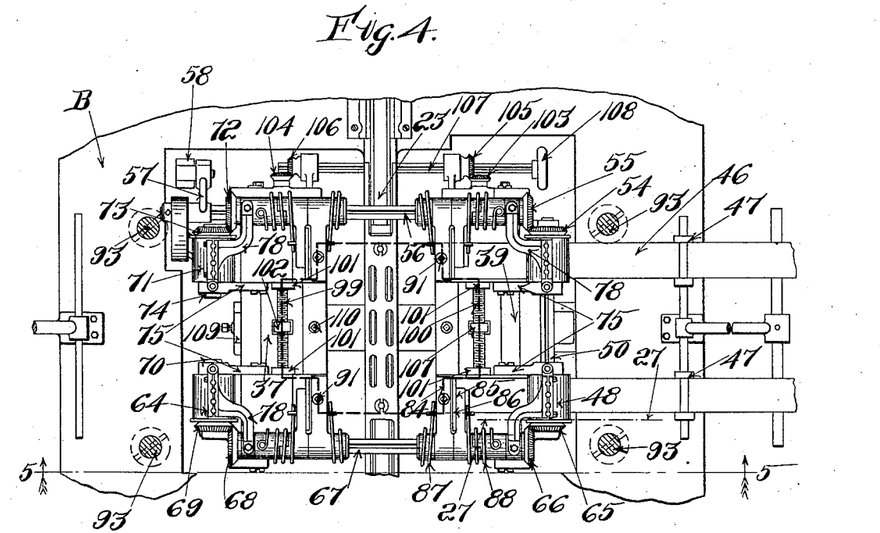
Fig. 4 is a top view of a portion of the machine with the presser head removed. This view shows the pressing and severing position.
Figure 5:
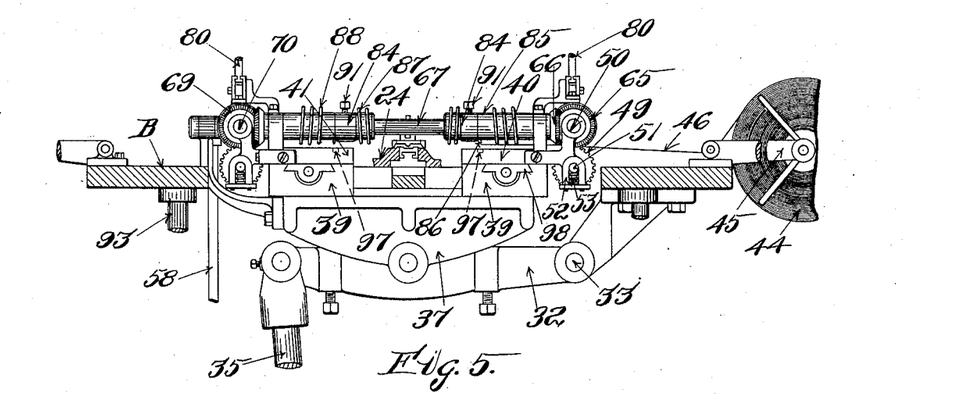
Fig. 5 is a section on line 5—5, Fig. 4, looking in the direction of the arrows.

The box blank Q after being fed forward from the hopper position by means of the lip 25 on the carrier 23 is located as shown by the dot and dash lines in the center of Fig. 4. At this time it rests on the upper side of a movable presser head which is supported on a link 32 (see Fig. 5) pivoted at 33 to a bracket 34 on the underside of the table B, and which is moved vertically by means of the connecting rod 35 which is actuated by the eccentric 36 on the cam shaft D. The presser head is thus given one complete reciprocation for each revolution of the cam shaft. Upon the link 32 is a truss 37 which supports a pair of cross supporting members 39 which in turn support the four lower pressing members, two of which, 40 and 41, are seen in Fig. 5.

In the following description, for the sake of brevity, I have described only one side of the machine, except where points of difference occur, since both sides of the machine are substantially alike.

The gummed stay strip from which are cut the pieces to be applied to the corners of the box blank is provided in the form of four reels 44 which are supported on brackets 45 at the sides of the machine. After leaving the roll, the stay strip 46 passes under a guide 47 and between a pair of feed rolls 48 and 49, the lower one of which 49 may be corrugated to insure a firmer grip on the stay strip. The stay strip then passes under cutters and under the edge of the box blanks as will be later described.

The feed rolls 48 and 49 are actuated from one source of power in the following manner. The upper feed roll 48 is located on a splined shaft 50 and the lower feed roll 49 is located on a parallel shaft 51 supported in a U-shaped bearing 52 in the frame of the machine and upwardly pressed against the upper feed roll 48 by means of a spring 53 at each end of the said shaft 51. The upper feed roll 48 is connected to the said splined shaft 50 by means of a ratchet which is indicated at 541 (see Fig. 27) of the well-known form by means of which the feed roll 48 is caused to advance by the rotation of the shaft in one direction, but stands still during the movement of the shaft 50 in the reverse direction. Such ratchet movements are of well-known construction and accordingly it has not been thought necessary to describe it in detail. On the end of the shaft 50 is a bevel gear 54 meshing with a corresponding bevel gear 55 on a cross shaft 56 which is also splined and at the opposite end of which is attached a rocker arm 57 which gives to the cross shaft 56 and splined shaft 50 the required oscillatory movement which by means of the ratchet in the feed roll 48, advances the stay strip a given and adjustable distance for each stroke of the machine. The cross shaft 56 is actuated by means of the connecting rod 58 pivoted at its lower end to one arm 59 of a rock shaft 60, which is itself hollow and incloses another shaft 601, which serves as the pivot for certain other rock shafts to be hereinafter described. Another arm 61 of the rock shaft 60 is provided with a cam roll 62 which engages a cam groove in the face of a plate cam 63. Said plate cam 63 is located on the cam shaft D and accordingly gives the cross shaft 56 and splined shaft 50 one complete oscillation for each rotation.

In the description so far, the manner in which the feed rolls on the right hand side of the machine are caused to rotate has been described. The feed roll 64 on the left hand side of the machine is simultaneously operated by means of a bevel gear 65 on the end of the splined shaft 50 meshing with a bevel gear 66 on one end of a cross shaft 67 also splined which corresponds to the cross shaft 56 heretofore described, and a bevel gear 68 at the other end of the said cross shaft 67 which meshes with a bevel gear 69 on the short shaft 70, upon which the feed roll 64 is located. The feed roll 64 is also provided with a ratchet so that it is caused to rotate, although its shaft 70 only oscillates. The fourth pair of feed rolls, one of which 71 is shown in the upper left hand corner of Fig. 4 is driven by a bevel gear 72 on the cross shaft 56, said bevel gear 72 meshing with a bevel gear 73 on the supporting shaft 74 which corresponds with the shaft 70 previously described. The shafts 50, 70 and 74 are supported on brackets 75 attached to the supporting members 39 which are themselves carried by the truss 37. It will, therefore, be seen that the entire feeding mechanism by means of which the gummed stay strip is fed into proper position is movable vertically to a slight extent as the presser head moves up and down, the whole mechanism being carried on the presser head.

The upper feed rolls are of rubber or other suitable material and moisten the gum on the stay strip. The surface of these rolls is wet by moisteners seen in Figs. 4, 5, 21, 22 and 23. These moisteners consist in a suitable casing made in two halves 76 and 77, attached to a bracket 78 which is also carried on the presser head and is screwed at one end to the bracket 75 previously referred to. Between the two parts of the casing is placed a thickness of felt, wicking or similar material 79 (see Fig. 23) which depends below the casing and drags or wipes upon the upper surface of the feed roll. Water is introduced into the casing and applied to the felt 79 by a flexible pipe 80 which connects with a tank 81 on the top of the machine and may be attached at various points in the casing as shown at 82 and 83. The amount of moisture applied to the gummed stay strip may be regulated by the amount of water allowed to flow through the pipe 80 to the felt or wicking 79.

After the gummed stay strip has been fed into position under the edge of the box blank, having been previously wet as described, the said stay strip is pressed onto the box blank and at the same time the portion thus caused to adhere to the box blank is severed from the main portion of the stay strip. The mechanism for accomplishing this will now be described. For each corner of the box a pair of arms 84 and 85 are provided one of which 84 forms the upper pressing member, the other of which 85 carries the stay cutter or knife 86. Both of the said arms 84 and 85 are loose upon the shaft and are held up by means of springs 87 and 88. Each of the upper pressing members 84 is provided with an adjustable stop or screw 91 the height of which may be adjusted as desired. These adjustable stops 91 are adapted to contact with the underside of the platen 92 (see Figs. 1 and 3), which is supported on four heavy vertical rods 93 which are provided at their upper ends with nuts 94 and cushion springs 95, so that the amount of pressure brought to bear upon the gummed stay strip by the upward movement of the presser head may be adjusted as required. Collars 96 are provided to keep the platen 92 from sliding down the four vertical rods 93. The lower pressing member 40 is provided with a groove 97 (see Fig. 5) one edge of which coöperates with the lower edge of the knife 86, the two acting like a pair of shears to sever the stay strip from the continuous piece.

It will be seen that after the stay strip 46 has been fed into proper position below the blank, the gum on the stay strip having been moistened by the wetting or upper feed roll, the presser head moves upwardly bringing the adjustable stops 91 in contact with the under surface of the platen 92 and thereafter causes the platen to rise slightly against the compression of the springs 95 on the upper end of the rods 93, thus firmly pressing the pieces of stay strip onto the appropriate portions of the box blank and applying to the pieces of stay strip a definite pre-determined pressure. At the same time the cutting operation is taking place so that the portion of the stay strip which has been glued to the box blank is severed from the portion attached to the reel, and the box blank is now in condition to have the sides thereof folded up into the shape of a box and the remaining portion of the partly attached stay strip or "corner stay" folded about the corner of the box blank and the remaining portion caused to adhere thereto to form the completed box.

As the machine is adapted for use on boxes of different sizes within a pre-determined range, means is provided for the adjustment of the positions of the upper pressing member 84, stay cutter arm 85, and wetting or feed rolls in the following manner: Ways 98 are formed in which slide the lower pressing members 40 and 41 to which are attached the brackets 75 which support the side shafts 50, 70 and 74. A pair of right and left threaded screw shafts 99 and 100 provided with screw threaded collars 101 and with a central fixed collar 102 which engages a semi-circular slot cut in the face of the supporting members 39 are arranged to be turned by the bevel gears 103 and 104 at their rear ends, the said gears 103 and 104 meshing with gears 105 and 106 on a splined hand shaft 107, on which the gears 105 and 106 are free to slide. The said shaft 107 is turned by a hand wheel 108, and this rotation of the said shaft causes the right and left screws 99 and 100 to rotate and draws the attached parts together or separates them more widely as the case may be. Adjustment at right angles to the adjustment just described is obtained by sliding the parts composing the two halves of this group of mechanism toward or from the center upon a slide 109 (see Fig. 1) extending transversely of the machine and formed on the upper side of the truss 37. The two halves are fixed in their proper position by means of the set screws 110.

Figure 7:
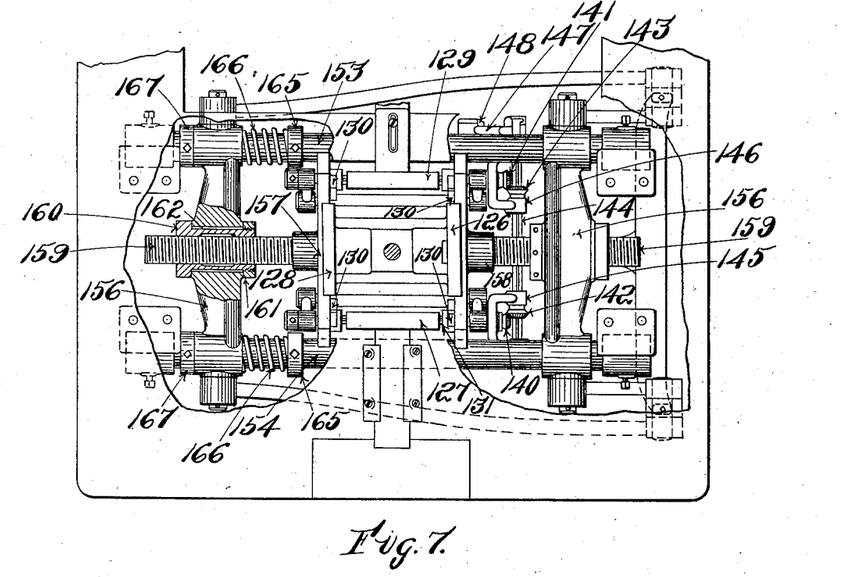
Fig. 7 is a plan view of the forming and corner turning mechanism with the bed plate broken away for convenience of illustration.

The mechanism by means of which the box blank is folded into form and the unattached portions of the stay strips pressed against the sides of the box and the box ejected from the machine will be now described. The box blank is carried forward from the pressing and severing position to the forming position as previously described by the feeder or carrier and is left in the position indicated by the dot and dash line in Fig. 7 with the main or body portion Q over the central hollow space in which the form or plunger 111 operates. The form or plunger consists of a block 111 of the size and shape of the interior of the box to be formed mounted upon a vertical shaft 112 which reciprocates in guides in a bracket 113 mounted on the table of the machine. The plunger 111 is reciprocated by means of a rock shaft 114, one arm 115 of which is connected by a link 116 to a collar 117 on the vertical shaft 112. The other arm 118 of the said rock shaft 114 is connected to a pitman rod 119, the lower end of which is attached to the arm 120 of a rock shaft 121 carried on a stud 122 on the frame of the machine. The other arm 123 of the said rock shaft is provided with a cam roll 124 which engages a groove in the face of a plate cam 125 on the cam shaft D. Each rotation of the cam shaft D gives the plunger one complete reciprocation.

Figure 8:
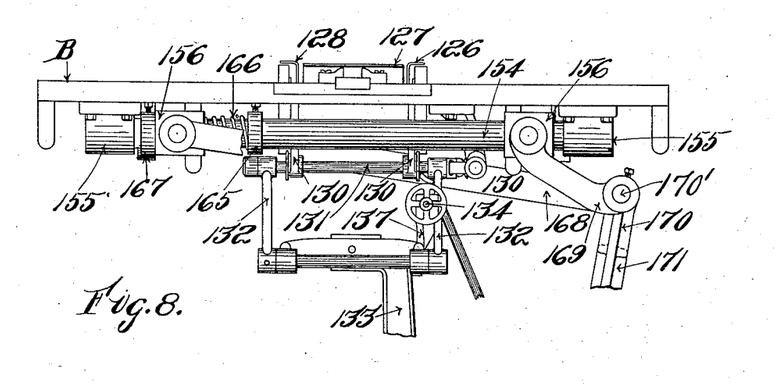
Fig. 8 is a front elevation of the parts shown in Fig. 7.
Figure 9:
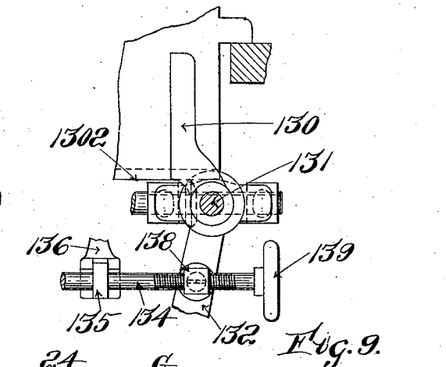
Fig. 9 is a side view of the adjusting mechanism for the corner turners.
Figure 10:
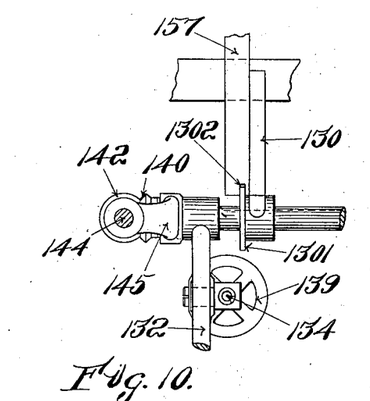
Fig. 10 is an end view of the mechanism shown in Fig. 9.

The sides of the box blank are folded up about the form or plunger 111 by means of four spring plates 126, 127, 128 and 129, the first three of which are seen in Fig. 8. The said spring plates comprise thin plates of some suitable spring material and are bent at the top to about a right angle with the bottom, but are given an easy curve, so that the blank which forms the box may be shaped certainly and without injury, about the former or plunger even when the latter descends at a rapid rate.

The four spring plates are arranged in pairs, one pair for the ends of the box and another pair for the sides of the box. The pair for the ends of the box, 126 and 128, are shown in detail in Figs. 16, 17 and 18. In those figures, the spring plate 128 is shown as attached by screws 705 to the side pressers 157 which will be later described. The spring plate 128 is formed in the shape of a loop, as shown at 501, and its upper end is turned at right angles to the main portion of the plate, as shown at 502. It will be seen that this arrangement of the spring plate gives it a considerable amount of flexibility or yieldingness, while at the same time, it acts firmly upon the board composing the box blank, and the turned over portion 502 prevents the spring plate from catching or tearing the board. The spring plate is considerably narrower than the full face of the side presser 157, as seen in Figs. 16 and 17, so that the spring plate while having sufficient area to act properly upon the body of the blank may not interfere with the operation of the side pressers in securing the stay strip to the box.

Figure 19:
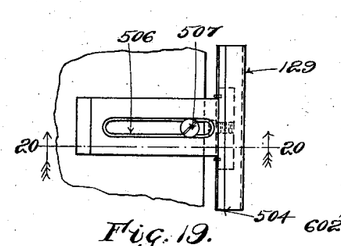
Fig. 19 is a detail of one of the side spring plates which assist in folding the box blank about the box form.
Figure 20:
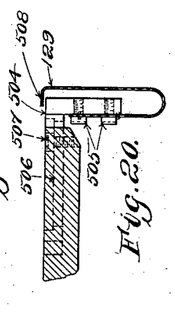
Fig. 20 is a section on line 20—20, Fig. 19.

One of the side spring plates 127 and 129 which fold the sides of the blank about the form, is shown in Figs. 19 and 20. The spring plate 129 is attached to a piece 504 by the screws 505, and the tail of the piece 504 is itself provided with a slot 506 and adjustably fastened to the table B by means of the screw 507. The spring plate 129 is also provided with a turned-back end 508 similar to that heretofore described in connection with the end spring plate.

In addition to the form or plunger 111 about which the box is formed, there is provided a follower 706 which is vertically reciprocated on the shaft 707 (see Fig. 1), and which is operated by a cam 708 on the cam shaft heretofore referred to. The connections between the cam and the said shaft 707 consists of a cam roll 709 and a rock shaft 710. The follower 706 is moved up by its cam so that its upper surface is just in engagement with the under surface of the box blank at the time when the under surface of the form 111 engages the upper surface of the said blank. The form or plunger 111 and the follower 706 move downwardly together holding firmly between them the portion of the box blank which becomes the bottom of the box so that the side and end portions of the said blank are more readily folded up about the form or plunger 111 by means of the spring plates which have just been described. After the forming or shaping of the box has taken place, the form 111 is withdrawn from the box, the box remaining on the follower ready to be acted upon by the ejectors which are later described.

At the corners of the box forming apparatus are located corner turners by means of which the unattached portion of the corner stay which extends beyond the edge of the box blank is folded around the corner of the box and attached to the appropriate portion of the box blank by pressure applied to the corner turner by pressing mechanism. These corner turners consist of four fingers 130, one for each corner stay. They are mounted in pairs on two splined shafts 131 (see Figs. 1, 7, 8, 9 and 10) which are carried on the upper ends of four swing arms or movable fulcrums 132 pivoted to a support or bracket 133 (see Fig. 8) on the frame of the machine. The corner turners 130 may be brought nearer to or separated from each other to compensate for different sizes of boxes by means of a right and left screw 134 provided with a collar 135 turning in a groove 136 in an upwardly extending portion 137 of the bracket 133, said right and left screw acting upon swing nuts 138 in the swing arms or movable fulcrums 132 and being provided with a hand wheel 139 by means of which it is rotated. The corner turners 130 are given a rotary reciprocation about the splined shafts 131 upon which they are mounted by means of a pair of bevel gears 140 and 141 meshing with bevel gears 142 and 143 on a second splined shaft 144 at right angles with the first pair of splined shafts. The said gears 142 and 143 are carried by brackets 145 and 146, and the said shaft 144 is given a rotary reciprocation by means of a link 147 fast to one end of the said splined shaft 144 and itself operated by a connecting rod 148 (see Fig. 1). The lower end of the connecting rod 148 is attached to one arm 149 of a bell crank lever, the other arm of which 150 is provided with a cam roll 151 which engages a groove in the plate cam 152 on the cam shaft D. It will be seen from the foregoing that the corner turners 130 are slidable longitudinally of the splined shafts 131 to adjust for different lengths of boxes while the gears 142 and 143 and their supporting brackets 145 are movable at right angles thereto for adjustment widthwise of the box. The manner of obtaining this adjustment will be hereinafter described.

After the corner turners 130 have performed their function of turning the corner stay about the corner of the box, the box having been previously folded by the action of the spring plates 126, 127, 128 and 129, it is necessary to apply a heavy pressure to the unattached portion of the corner stays in order that the corner stay and the box blank may be made to adhere firmly to each other, it being well-known that adhesion of two pieces of paper, cloth or cardboard may be effected without waiting for the glue or paste between them to dry if a sufficiently heavy pressure be applied. The pressure is applied to the corner stay through the corner turner by means of side pressers 157 and 158 which contact with the surface of the corner turner and cause the corner turner to slide slightly longitudinally of the shaft 131 and press the corner stay onto the adjacent portion of the box blank. The corner turner 130 is maintained constantly in proper relation to the side presser 157 by means of a flange 1301 engaging a corresponding groove 1302 seen in dotted line in Fig. 9.

Beneath the table B of the machine are supported a pair of heavy guide rods 153 and 154 in lugs 155 which are bolted to the under side of the table B. A pair of cross heads 156 are arranged to slide on the said guide rods 153 and 154. To the cross heads is adjustably attached the side pressers 157 and 158 by means of a large screw 159. Provision for the adjustment of the side pressers 157 is afforded by means of a combined collar and sleeve 160 which slides into a hole 162 (see Fig. 7) in the cross head 156. This sleeve 160 is held in place by a lock nut 161 on the inner end of the sleeve 160 which takes a bearing against the inner side of the cross head 156. As the adjustment for the pressing member 158 is exactly the same, it has not been thought necessary to describe it in detail. In order that the pressing members 157 and 158 may be separated again after the pressing has taken place, I place upon each of the guide rods 153 and 154 a collar 165 and locate between the said collar 165 and the cross head 156 a spiral spring 166 which tends to push the cross head and connected parts away from the box form. Collars 167 serve to limit the motion of the cross head in this direction.

The two side pressers 157 and 158 are operated by a pair of inverted toggle joints, each composed of two links 168 and 169 (see Fig. 8), and the two toggles are connected by means of a yoke 170 (see Fig. 1) and are operated by a link 171 attached to the said yoke. The link 171 is pivoted at its lower end to one arm 172 of a bell crank, the other arm of which 173 is provided with a cam roll which runs in a path in the side of a face cam 174, the said face cam 174 and the cam 152 previously referred to being made in one piece for convenience.

It will be seen that the two cross-heads 156 against which the ends of the links 168 and 169 act are free to move longitudinally of the guide rods 153 and 154 and that the pivot 170' between the ends of the said two links is not located between the cross-heads but outside of them, thereby forming an inverted toggle joint which forces the side pressers 157 and 158 toward each other with an equal pressure. This construction employing the inverted toggle avoids the unequal pressure which results where two toggle joints of the ordinary construction operating against fixed abutments are employed. It will also be seen that the inverted toggle joint is one in which the pivot between the two links is located outside of the space between the opposite ends of the said links, instead of in the space between the opposite ends of the links.

It will be seen from the foregoing that the parts of the machine heretofore described have passed the box blank through the various steps required to apply the corner stay to the corners of the box, have formed the box and pressed the stay strip securely in place so that the box is now completed ready to be ejected from the machine.

Figure 3:
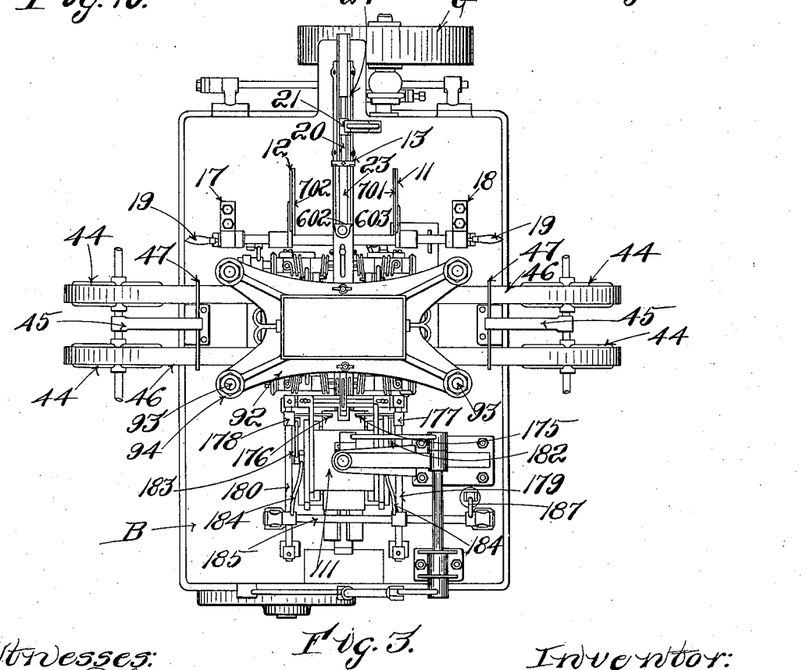
Fig. 3 is a top view of the machine.

The ejection of the completed box from the machine is accomplished by means of ejectors 175 and 176 which are adapted to engage the rear wall of the box after the plunger 111 has been withdrawn and to push it out of the machine in the direction of the bottom of the figure as seen in Fig. 3 or to the right as seen in Fig. 1. The said ejectors 175 and 176 are attached to collars 177 and 178 which slide upon the guide rods 179 and 180, the same being mounted in brackets 181 (see Fig. 1) on the table B of the machine. The ejectors 175 and 176 are actuated by a pair of links 182 and 183 pivoted to a pair of arms 184 on a rock shaft 185 supported in a pair of brackets 186 on the table B of the machine. A third arm 187 of the rock shaft 185 is connected with the long pitman rod 188, the lower end of which is attached to one arm 189 of the bell crank lever pivoted on the shaft 601 (see Figs. 1, 2 and 6). The other arm of this bell crank lever 190 engages a plate cam 191 on the cam shaft D hereinbefore described. It will be seen that each revolution of the cam shaft will cause the ejectors to move quickly toward the right of the machine as seen in Fig. 1, and will throw the box from which the plunger has just been withdrawn out of that side of the machine where it may be conveniently picked up by an attendant.

From the foregoing it will be seen that there are a number of cams on the cam shaft D which operate the various groups of mechanism as have been described. For convenience, the cam 25 which operates the feeder may be called the feeder cam. The cam 63 may be called the stay strip feed cam; the cam 152 and the cam 174, which are made in one piece, may be called the corner turner cam and the side presser cam respectively; the cam 708 may be called the follower cam; the cam 191 the ejector cam; the cam 123 the former or plunger cam. It will also be seen that in addition to the cams just mentioned, there is located on the cam shaft D the eccentric 36 which operates the lower pressing members.

It will also be seen that the machine embodying my invention takes a properly cut box blank, feeds it to a position where corner stays of proper size are applied to one edge of each portion of the box blank which is to furnish a finished corner of the box, forms the box blank into its final shape, attaches the other portion of the stay strip to the box blank and ejects the finished box from the machine. In other words, the machine embodying the invention takes a pile of box blanks and the requisite staying material and turns out completed boxes. It is capable of being run at a very high speed without affecting the qualities of the boxes. It requires little or no attendance after it has once been started beyond keeping it supplied with materials, and is capable of adjustment for a large range of sizes of boxes.

What I claim is:

1. In a machine of the character described, the combination of means for applying simultaneously one-half of a corner stay in proper position to each corner of the flat blank for a box, means for bringing the appropriate portions of said blank into positions adjacent each other, and means for simultaneously applying the other half of each of said corner stays to the proper portion of the blank.

2. In a machine of the character described, the combination of means for applying simultaneously a portion of a corner stay in proper position to each corner of a flat blank, means for folding the blank, and means for simultaneously applying the remainder of each stay to the corresponding edge of the folded blank.

3. In a machine of the character described, means for applying simultaneously one-half of a corner stay in proper position to each corner of a flat blank, means for folding the blank, and means for simultaneously applying subsequently the other half of each of said corner stays to the proper portion of the blank.

4. In a machine of the character described, a hopper, means for applying simultaneously a half of pieces of stay strip to appropriate portions of a flat blank, means for forming the blank, means for applying simultaneously the remainder of the pieces of stay strip to the appropriate portions of the blank, and a feeder for successively transferring the blank from the hopper to the position in which the pieces of stay strip are first applied to said blank.

5. In a machine of the character described, the combination of a hopper, means for applying simultaneously one half of pieces of stay strip to appropriate portions of a flat blank, means for forming the blanks, means for applying simultaneously the remainder of each piece of stay strip to its appropriate portion of the blank, and a feeder operating to transfer the blank from the hopper to the position in which the pieces of stay strip are first applied to said blank, and from the last mentioned position to the forming position whereby each blank is caused by the said carrier to occupy successively each position, and a blank in the hopper and another in the position in which the pieces of stay strip are first applied to said blank are moved forward simultaneously.

6. In a machine of the character described, a hopper means for applying simultaneously half of pieces of stay strip to appropriate portions of a flat blank, means for forming the blank, and means for applying simultaneously with each other the remainder of the pieces of stay strip to the appropriate portions of the blank, a feeder or carrier for successively transferring the blank from the hopper to the position in which the pieces of stay strip are first applied to said blank, and from the last mentioned position to the forming position and an ejector.

7. In a machine of the character described, a hopper, pressing mechanism for applying pieces of stay strip to appropriate portions of a blank, forming mechanism, feeding mechanism acting simultaneously upon a blank in the hopper and the blank to which the pieces of stay strip have just been applied to transfer the blank in the hopper to the pressing mechanism and the blank to which the pieces of stay strip have just been applied to the forming mechanism.

8. In a machine of the character described, a hopper, pressing mechanism for applying pieces of stay strip to appropriate portions of a blank, forming mechanism, feeding mechanism acting simultaneously upon a blank in the hopper and the blank to which the pieces of stay strip have just been applied to transfer the blank in the hopper to the pressing mechanism and the blank to which the pieces of stay strip have just been applied to the forming mechanism, and ejecting mechanism acting simultaneously with the said feeding mechanism to eject the finished box from the machine.

9. In a machine of the character described, a hopper, pressing mechanism for applying pieces of stay strip to appropriate portions of a blank, forming mechanism, and a feeder provided with two lips, one of which engages the bottom blank in the hopper and the other of which engages the blank to which the pieces of stay strip have just been applied to move the said two blanks into their succeeding positions in the machine.

10. In a machine of the character described, pressing mechanism for applying simultaneously a portion of pieces of stay strip to appropriate portions of a flat body blank, forming mechanism for forming the said body blank, and pressing mechanism for subsequently simultaneously applying the unattached portions of said pieces to the appropriate portions of the body blanks.

11. In a machine of the character described, pressing mechanism for applying a portion of pieces of stay strip to appropriate portions of a body-blank, forming mechanism for forming the said body-blank, corner turning mechanism for bending the unattached portions of said pieces of stay strip about the corner of the box, and pressing mechanism for applying said unattached portions of the pieces of stay strip to the blank.

12. In a machine of the character described, mechanism for applying a portion of pieces of stay strip to appropriate portions of the body blank, forming mechanism for forming said body blank, corner turning mechanism for folding the unattached pieces of said stay strip about the corner of the box and pressing mechanism operating on said corner turning mechanism for pressing the unattached portions of the pieces of stay strip onto the blank.

13. In a machine of the character described, a hopper where blanks are received, pressing mechanism applying simultaneously a portion of pieces of stay strip to appropriate portions of a flat blank, forming mechanism for forming the said blank, and feeding mechanism for transferring the blank from the hopper to the pressing mechanism and from the pressing mechanism to the forming mechanism.

14. In a machine of the character described, a hopper, pressing mechanism for applying pieces of stay strips to appropriate portions of a blank, forming mechanism, a feeder provided with two lips, one of which engages the bottom blank in the hopper and the other of which engages the blank to which the pieces of stay strip have just been applied to move the said two blanks into their succeeding positions in the machine, and a presser foot to hold the said blanks in contact with the feeder during the transfer from one position to the other.

15. In a machine of the character described, means for attaching four pieces of stay strips to appropriate portions of a box blank simultaneously, forming means for forming the said blank and attached pieces of stay strip, and means for pressing simultaneously the unattached portions of said pieces of stay strip about the corners of the said box blank after it has been formed.

16. In a machine of the character described, a hopper, pressing mechanism for applying one-half of pieces of stay strip to appropriate portions of the blank, forming mechanism for shaping the blank, a feeder, two lips of the said feeder, one for transferring the blank from the hopper to the pressing position and the other for transferring the blank from the pressing position to the forming position and a presser foot to hold the blanks upon the feeder consisting of a spring pressed member extending from the front of the hopper to the rear of the forming mechanism.

17. In a machine of the character described, the improved forming mechanism for forming and completing a box from a blank to which one-half of pieces of stay strip have previously been partly attached which consists of a form to engage the inside of the blank, a follower which engages the other side of the box blank, spring side plates, corner turners which wipe the pieces of stay strip about the corners of the blank and pressing mechanism for the said pieces of stay strip.

18. In a machine of the character described, the improved mechanism for simultaneously feeding stay strip to the four corners of the body-blank which consists in an upper and lower feed roll for each stay strip, one pair of said upper and lower feed rolls being on the same shaft, ratchet mechanism for each pair of said feed rolls, a gear for each said ratchet mechanism, two cross shafts upon which the said gears are arranged in pairs, and a crank to impart oscillation of the said shafts.

19. In a machine of the character described, the improved adjustable stay strip applying mechanism, which comprises a truss upon which the pressing members and the feeding mechanism for each corner are supported in two groups, a slideway upon the said truss by means of which the two groups of mechanism may be caused to approach each other, and splined cross shafts for operating the said two groups of mechanism, regardless of their position on the said truss.

20. In a machine of the character described, the improved corner stay applying mechanism for body-blanks in flat condition, comprising a group of elements for each corner of the body-blank, said group of elements being adjustable in pairs in one direction and in different pairs in a direction at right angles with the first mentioned direction.

21. In a machine of the character described, the improved corner stay applying mechanism for body-blanks in flat condition, comprising a group of elements for each corner of the body-blank, said group of elements being adjustable in pairs in one direction by means of a slideway and in different pairs in a direction at right angles with the first mentioned direction by means of a right and left screw.

22. In a machine of the character described, the improved corner stay applying mechanism for body-blanks in flat condition, comprising a group of elements for each corner of the body-blank, each of said group of elements comprising an under presser provided with a shearing edge, an upper presser, a cutting member coöperating with the said shearing edge, and a pair of feed rolls, said group of elements being adjustable in pairs in one direction and in different pairs in a direction at right angles with the first mentioned direction.

23. In a machine of the character described, a box form about which may be formed a blank to which has been previously partly attached pieces of stay strip, independently and positively movable corner turners for wiping the unattached portions of the said pieces of stay strip about the corners of the box, and positively moving mechanism exerting pressure upon the corner turners and thereby pressing said unattached portions onto the said blank.

24. In a machine of the character described, corner turning mechanism for folding the unattached portions of previously partly attached pieces of stay strip about the corner of the box-blank comprising reciprocating corner turners, pivots therefor, operating means therefor, and adjusting means for the said pivots comprising a movable fulcrum pivoted to a fixed part of the machine.

25. In a machine of the character described, corner turning mechanism for folding the unattached portions of previously partly attached pieces of stay strip about the corner of the box-blank comprising pivoted reciprocating corner turners, operating means therefor, adjusting means for the said corner turners comprising movable fulcrums pivoted to a fixed part of the machine, and adjusting means for said movable fulcrums.

26. In a machine of the character described, the improved mechanism for attaching the unattached portions of previously partly attached pieces of stay strip to appropriate portions of formed body-blanks, comprising side pressers and an inverted toggle joint for operating said side pressers.

27. In a machine of the character described, the improved mechanism for attaching the unattached portions of previously partly attached pieces of stay strip to appropriate portions of formed body-blanks, comprising side pressers, guide rods upon which said side pressers are guided, and an inverted toggle joint to operate said side pressers.

28. In a machine of the character described, the improved mechanism for attaching the unattached portions of previously partly attached pieces of stay strip to appropriate portions of formed body-blanks, comprising side pressers, guide rods upon which said side pressers are guided, an inverted toggle joint to operate said side pressers, and separating means by which said side pressers are separated after each stroke of the machine.

29. In a machine of the character described, the improved mechanism for attaching the unattached portions of previously partly attached pieces of stay strip to appropriate portions of formed body-blanks, comprising side pressers, guide rods upon which said side pressers are guided, an inverted toggle joint to operate said side pressers, and separating means comprising collars on the said guide rods and a spring about the said guide rod and acting on the said collar and one of the said side pressers to separate the said side pressers after each stroke of the machine.

30. In a machine of the character described, the combination with a reciprocating pressing member, of a corner turner oscillating in a plane at right angles with the line of movement of the pressing member, a shaft on which the said corner turner is slidably mounted, and engaging means connecting the corner turner and the pressing member and causing the corner turner and the pressing member to maintain the same position with relation to each other, regardless of the position of the pressing member.

31. In a machine of the character described, the combination with a reciprocating pressing member provided with a groove, of a corner turner oscillating in a plane at right angles with the line of movement of the pressing member, a shaft on which the said corner turner is slidably mounted, and a collar on the corner turner engaging the groove in the said pressing member, whereby the said corner turner is constantly maintained in the same longitudinal position with relation to the pressing member, but is free to oscillate with its shaft and to slide transversely of the line of movement of the pressing member.

32. In a machine of the character described, the improved mechanism for attaching the unattached portions of previously partly attached pieces of stay strip to appropriate portions of formed body-blanks, comprising movable side pressers, guide rods, cross heads slidable on the said guide rods, a screw fixedly attached to the said side pressers, and a screw threaded collar and lock nut in the said cross head for adjusting the said side pressers with relation to each other and to the cross heads so that the mechanism may be adapted to operate on different sizes of boxes.

33. In a machine of the character described, the improved ejecting mechanism comprising a pair of ejectors, guide rods therefor, a rock shaft causing said ejectors to slide on said guide rods, and a form operating said rock shaft.

In testimony whereof I affix my signature, in presence of two witnesses.

EUGENE H. TAYLOR.

Witnesses:
GEORGE P. DIKE,
JOHN H. PARKER.

---

Copies of this patent may be obtained for five cents each, by addressing the "Commissioner of Patents, Washington, D. C."